US007623546B1

(12) United States Patent
Bashyam et al.

(10) Patent No.: US 7,623,546 B1
(45) Date of Patent: Nov. 24, 2009

(54) LATENCY IMPROVEMENT FOR FILE TRANSFERS OVER NETWORK CONNECTIONS

(75) Inventors: Murali Bashyam, Fremont, CA (US); Nagaraj Bagepalli, San Jose, CA (US); Abhijit Patra, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 666 days.

(21) Appl. No.: 11/303,577

(22) Filed: Dec. 15, 2005

(51) Int. Cl.
*H04J 3/16* (2006.01)
(52) U.S. Cl. .................................... 370/465
(58) Field of Classification Search ................ 370/252, 370/230, 465, 217, 352, 401, 410, 466–467, 370/496, 242, 244–245, 412–413, 522, 524, 370/254, 255, 389; 709/222, 224, 232, 235
See application file for complete search history.

(56) References Cited

U.S. PATENT DOCUMENTS 6,674,713 B1 * 1/2004 Berg et al. ................. 370/217
7,103,006 B2 * 9/2006 Garcia et al. ............... 370/252

OTHER PUBLICATIONS

Cisco Systems, Inc., "Cisco Secure Desktop Configuration Guide for VPN 3000 Concentrator Series and Catalyst 6500 Series WebVPN Services Module Administrators, Release 3.1," retrieved from the internet: <URL: http://www.cisco.com/en/US/products/ps6742/products_configurati...>, retrieved on Mar. 22, 2006. (3 pages).
Cisco Systems, Inc., "Catalyst 6500 Series WebVPN Services Module Command Reference, 1.2," retrieved from the internet: <URL: http://www.cisco.com/en/US/products/hw/switches/ps708/products...>, retrieved on Mar. 22, 2006. (62 pages).
Mogul, J.C. et al., "*Rethinking the TCP Nagle Algorithm*", ACM SIGCOMM Computer Communication Review, Jan. 2001, 15 pages.

* cited by examiner

*Primary Examiner*—Chi H Pham
*Assistant Examiner*—Alexander Boakye
(74) *Attorney, Agent, or Firm*—Hickman Palermo Truong & Becker LLP

(57) ABSTRACT

A method of improving latency time of a data transfer between a sender and a receiver, receiving an odd number of data segments from among a plurality of data segments the receiver determines if it is waiting for a further data segment of less than full size. The determination is based on a total number of data segments received, an amount of information expected in the data transfer, and a maximum segment size. If the receiver is waiting for a further data segment of less than full size then sending a message is sent to the sender that triggers the transmission by the sender of said less than full size data segment.

17 Claims, 3 Drawing Sheets

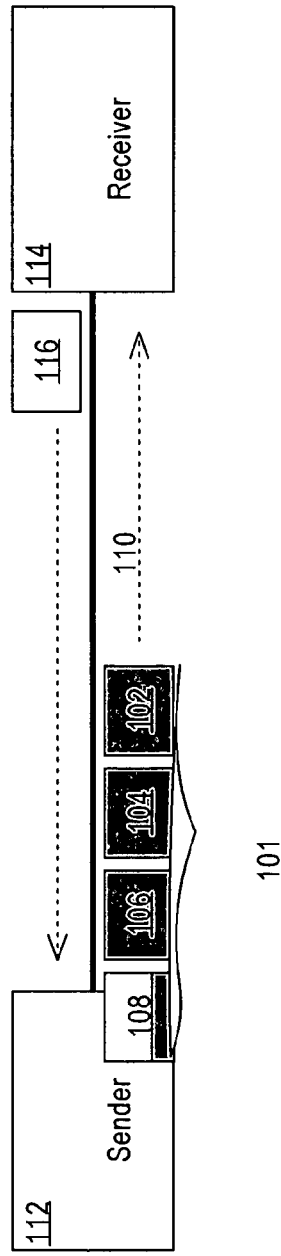
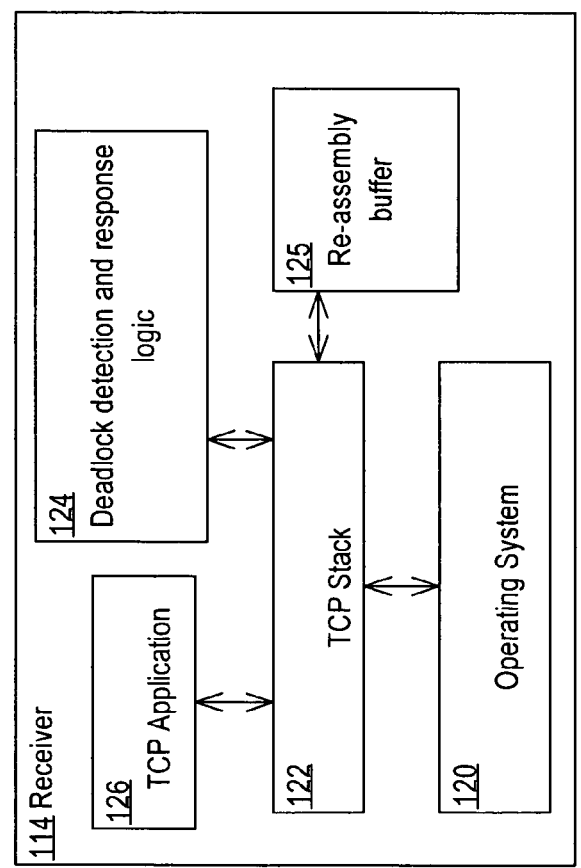
FIG. 1A
FIG. 1B

LATENCY IMPROVEMENT FOR FILE TRANSFERS OVER NETWORK CONNECTIONS

FIELD OF THE INVENTION

The present invention relates generally to latency improvement over network connections where a network transport protocol implements the Nagle algorithm for the transfer of data. The invention relates more specifically to receiver-side control of deadlocks due to Nagle where packet segmentation results in an odd number of packets followed by a partial packet.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Transport Control Protocol (TCP) as defined in IETF RFC 793 specifies a transport layer protocol for data networks. TCP generally consists of a set of rules defining how entities interact with each other. The OSI network model defines a series of communication layers, including a transport layer and a network layer. At the transport layer, TCP is a reliable connection-oriented transport protocol. When a process at one network entity wishes to communicate with another entity, it formulates one or more messages and passes them to the upper layer of the TCP communication stack. These messages are passed down through each layer of the stack where they are encapsulated into segments, packets and frames. Each layer also adds information in the form of a header to the messages. The frames are then transmitted over the network links as bits. At the destination entity, the bits are re-assembled and passed up the layers of the destination entity's communication stack. At each layer, the corresponding message headers are stripped off, thereby recovering the original message that is handed to the receiving process.

In a typical implementation of TCP, the receiver of data hold received out-of-order data segments in a re-assembly buffer pending receipt of any missing segments. The receiver sends an acknowledgment ("ACK") message for each segment that is received and indicating the last valid sequence number. The sender holds non-acknowledged segments in a re-transmission buffer. This process enables a sender to rapidly re-transmit segments that have been lost in transmission, because such segments are not acknowledged.

It is not required or necessary that every segment be explicitly acknowledged. Given the overhead associated with TCP, explicit acknowledgment of every segment, could generate significant extra traffic along the connection. Therefore, a typical TCP implementation provides that the receiver delays sending an ACK until it receives two full data segments thus reducing the traffic along the network. The Nagle Algorithm provides that a sender must not have more than one unacknowledged partial data segment. Any further data from the application is held by the sender until the outstanding segment is acknowledged. Here partial means of size less than the maximum segment size. The purpose of Nagle is to prevent congestion of the network by transmission or re-transmission of multiple partial segments.

A problem arises according to the above TCP implementation. Specifically, when a large upload data transfer is initiated over a HTTPS connection and the TCP connection has the Nagle algorithm implemented, a latency problem arises due to the segmentation logic of the TCP sender and the TCP receiver's delay acknowledgment logic. In one implementation, a deadlock of about 200 ms will occur when an odd number of segments have been transmitted and received and the remaining outstanding segment is a partial segment.

When a TCP sender transmits an odd number of segments and the remaining segment is a partial segment, the TCP sender will refrain from sending the remaining partial packet as required by the Nagle algorithm. Consequently, when the TCP receiver receives an odd number of segments the receiver will refrain from sending an ACK under its default delay acknowledgement logic. Instead, the TCP receiver will start a default delayed ACK timer which typically lasts 200 ms, after which the TCP receiver times out and will acknowledge the last full segment received, thus breaking the deadlock. High latency occurs in such a transfer due to the cumulative effect of several of the 200 ms delays, in some cases one delay per data record transmitted.

This is not desirable in highly interactive environments such as a client/server interaction or a screen based terminal session in which endpoints always communicate data records comprising an odd number of segments and a partial segment. This problem is also found in HTTPS communications in which the sender's SSL or TSL layer generates large records. Nagle can be turned off to prevent the problem. However, due to the significant reduction in extra traffic across the connection it is highly beneficial to enforce Nagle along with the delayed acknowledgement logic.

Additionally, in many cases the TCP receiver does not have control over the TCP sender's logic. For example, in a client/server context the TCP stacks of different senders will exhibit wide variations and are outside the control of any network administrator. Therefore, is it not practical in many cases to turn off Nagle at the sender or implement a TCP sender-based solution.

The deadlock problem and sender-side solutions are described in *Rethinking the TCP Nagle Algorithm* by J C Mogul & G Minshall, ACM SIGCOMM Computer Communication Review, January 2001. Thus there is a need for receiver-side control of deadlocks arising from the implementation of the Nagle algorithm in a connection.

BRIEF DESCRIPTION OF THE DRAWINGS

FIG. 1A is a block diagram that illustrates an example network context upon which embodiments of the modified receiver for preventing latency over the HTTPS connect can be implemented.

FIG. 1B is a block diagram that illustrates an embodiment of the modified network receiver

DETAILED DESCRIPTION

Figure 2:
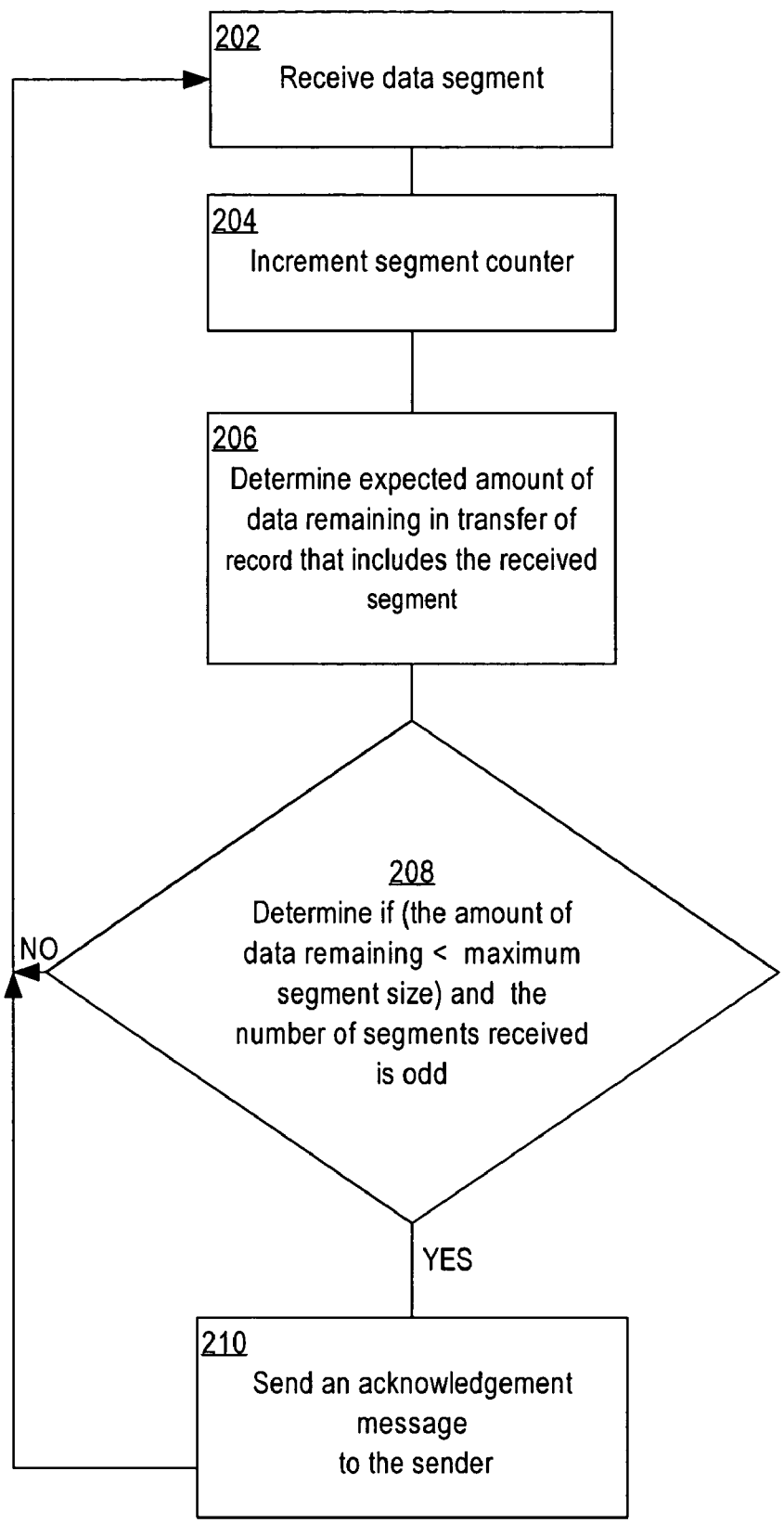
FIG. 2 is a flow diagram that illustrates a high level overview of a method improving the latency caused by implementation of the Nagle algorithm.

A method and system for latency improvement for file transfer over network connections is described. In the following description, for the purpose of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

Embodiments are described herein according to the following outline:

1.0 General Overview
2.0 Structural and Functional Overview
3.0 Implementation Mechanisms—Hardware Overview
4.0 Extensions and Alternates

1.0 GENERAL OVERVIEW

The needs identified in the foregoing Background, and other needs and objects that will become apparent for the following description, are achieved in the present invention, which comprises, in one aspect, a method comprising the steps of receiving an odd number of data segments from among a plurality of data segments and determining whether the receiver is waiting for a further data segment of less than full size. The determination may be based on the number of segments received, an amount of information expected in the data transfer, and a maximum segment size. If a segment having a length less than a full segment is being withheld by the sender, then a message is sent to the sender that trigger the transmission of the less than full size data segment One feature of this aspect is that the amount of information expected in the data transfer is calculated from a total amount of data expected and the amount of data already received in the data transfer. Another feature of this aspect is that the total amount of data expected in the data transfer is received by the receiver and sent by the sender. Another feature of this aspect is that the amount of data already received in the data transfer is the sum of the size of all data segments received In yet another feature of this aspect, the message sent to the sender that triggers transmission of the less than full sized data segment is an acknowledgement message. Another feature of this aspect is that determining if an odd number of data segments have been received is indicated by a counter that is incremented each time that a full-size segment is received.

In one embodiment only the receiving end of the data transfer is modified to trigger the acknowledgment and the transmission of the partial packet.

2.0 STRUCTURAL AND FUNCTIONAL OVERVIEW

Techniques are provided for modifying data processing performed by a TCP receiver to accept feedback during a data record reassembly and prevent a deadlock caused by the sender's implementation of Nagle.

When a data transfer is initiated over a network connection and a sender's TCP connection has the Nagle algorithm implemented, a deadlock between the TCP sender and TCP receiver occurs where a record of data has been segmented such that an odd number of full size data segments are followed by a partial data segment.

In one embodiment the method is implemented purely on the receiving end of the data transfer, leaving the logic of the sender unchanged.

In FIG. 1A a record 101 of data is broken into a series of data segments 102, 104, 106 and 108 in order to be transferred from a sender 112 across a network connection 110 to a receiver 114. In one embodiment network connection 110 is a HTTPS connection. However, network connection 110 can be any type of connection. Segments 102, 104 and 106 are full sized segments. A full sized segment means the number of bytes of data in the segment equals the maximum segment size. Segment 108 is a partial segment having less data than the maximum segment size.

Each segment is received at the receiver 114 and processed for reassembly into a record. The receiver 114 receives information from the record layer that the record layer collected during the reassembly process, such as the amount of data remaining before reassembly to be completed. Based on this information the receiver determines if the conditions for a deadlock have occurred and the receiver needs to send a message to force the sender to transmit the particular data segment 108.

As illustrated in FIG. 1A the conditions for a deadlock will occur. First, by default, the sender 112 will have the Nagle algorithm enabled. Second, the receiver 114 will enforce delayed ACK logic and only send a TCP ACK message for every other segment that is received. Third, since there are an odd number of full segments 102, 104 and 106, the sender 112 will not send the partial segment 108 until the sender 112 receives an ACK from the receiver 114. Lastly, since receiver 114 will only ACK every other segment the receiver 114 will be waiting for segment 108 before the receiver 114 sends an ACK. Thus, a deadlock will occur.

According to an embodiment of the approach herein receiver 114 will send a forced ACK 116 to break the deadlock.

When a segment of data arrives at the receiver 114 the segment is processed for reassembly of the data record 101. During this reassembly process the receiver 114 will determine if the deadlock will occur and therefore generate an immediate ACK. The receiver 114 determines whether such a deadlock will occur based on: the number of segments received, an expected amount of data remaining transfer, and the maximum segment size.

FIG. 1B is a block diagram of receiver 114. The modified receiver receives and maintains the data segments in the reassembly buffer 125. As the data segments are re-assembled and passed up the TCP stack 122 to the TCP application 126 the TCP header will be stripped off. The TCP Application 126 is an HTTP application, for example, or a combination of SSL and applications that use HTTPS. In one embodiment, contained within a TCP header is the total length of the record. The total length of the record along with the length of the record already received and re-assembled is passed to the deadlock detection and response logic 124. The deadlock detection and response logic 124 will determine if the TCP application 126 should send a TCP acknowledgement message to prevent a deadlock.

FIG. 2 is a flow diagram of the steps performed in determining whether the receiver should generate an immediate acknowledgement to preempt a deadlock. In step 202, a data segment is received. When a segment is received the segment is processed for reassembly. For example, an SSL layer at the receiver reassembles a full record before decrypting and passing on the record to the application. In step 204, for every full-size segment received, the receiver increments a segment counter.

In step 206 the receiver calculates the expected amount of data remaining in a transfer of data record that includes the received segment. The determination of the expected amount of data remaining the transfer is based on the record length (the total amount of data in the record) minus the amount of data in the reassembled record (the amount of data received so far since the beginning of reassembly). In a TCP implementation the receiver learns the expected record length from the TCP segments. Typically, the first TCP segment or initial message sent to the receiver will include the record length within the TCP header. The receiver uses the expected amount of data remaining in step 208 to determine whether to send an immediate acknowledgment message. In step 208, if the number amount of data remaining is less then the maximum segment size (MSS) and the number of segments received is odd, then an acknowledgement message is sent in step 210. In a TCP embodiment, the acknowledgement message is a TCP ACK segment.

In a TCP implementation the ACK immediately acknowledges all received data up to the last full segment. By forcing the ACK under the conditions of step 208, the delayed ACK timer stops, thus preventing unnecessary delay and deadlock. When the sender receives the immediate ACK, according to the Nagle Algorithm, the sender can transmit the last partial segment of the record.

Table 1 presents a pseudo-code listing of an algorithm implementing FIG. 2 that may be used as the basis for one example software implementation of the approach herein.

TABLE 1

| | |
|---|---|
| Rlen | Record length |
| CurrLen | Bytes assembled so far |
| NumSegs | Number of Segments received so far since the beginning of reassembly |
| RecvMSS | Received MSS |
| PendBytes | Bytes needed to finish reassembling the record |

While processing a TCP segment that is part of the SSL record and the record reassembly is incomplete, the following pseudo-code is used:

NumSegs++;
PendBytes = Rlen − CurrLen;
If ((PendBytes < RecvMSS) && (NumSegs is odd)) {
Mark Connection for immediate ACK;
Perform TCP output; // this will send out the ACK //
}

This solution has the advantage that it is purely a TCP receiver side modification and does not require any modification to the sender's TCP/SSL stack, while still preserving the advantages of the Nagle algorithm.

3.0 IMPLEMENTATION MECHANISMS

Hardware Overview

Figure 3:
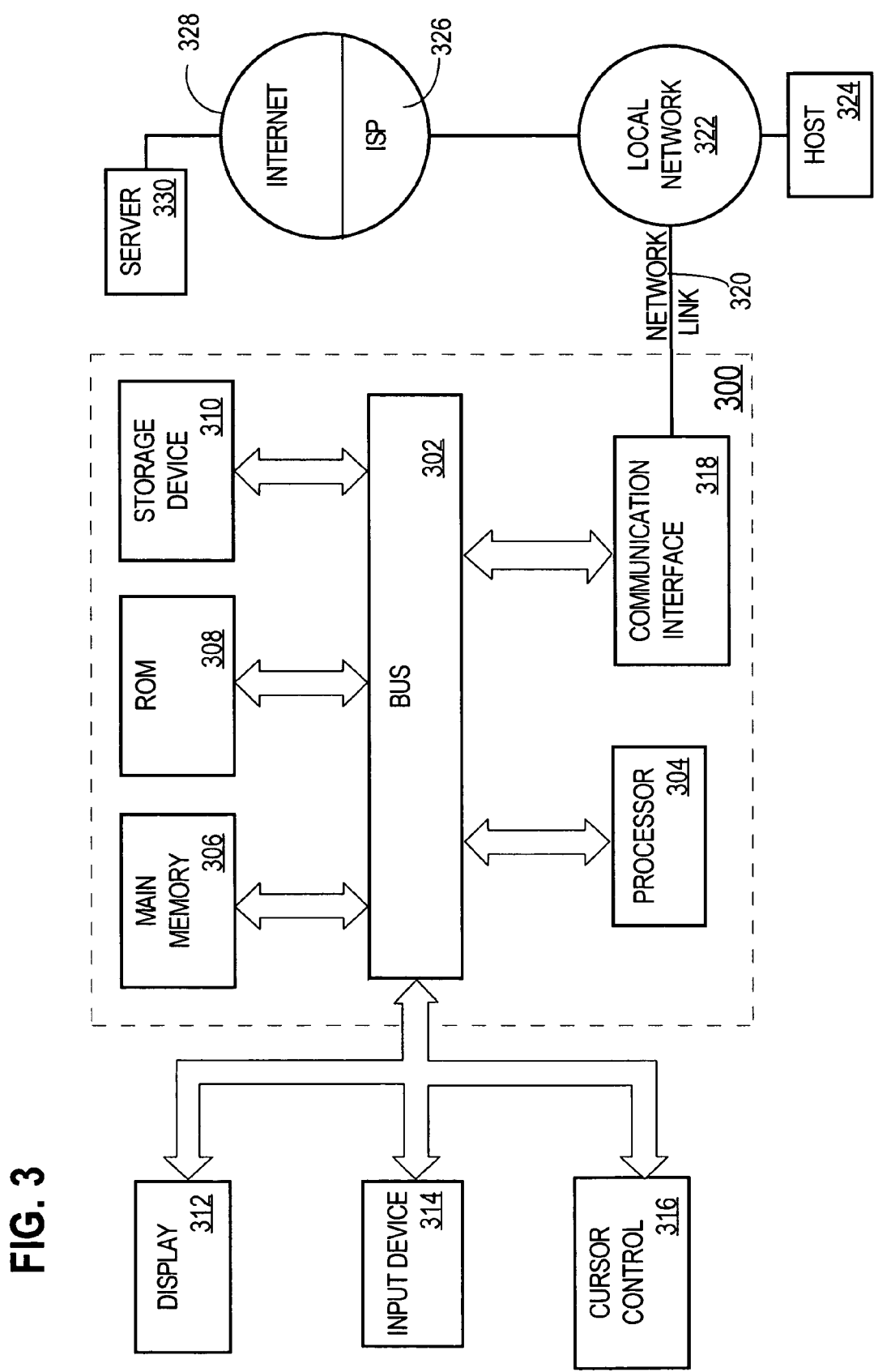
FIG. 3 is a block diagram that illustrates a computer system upon which an embodiment may be implemented.

FIG. 3 is a block diagram that illustrates a computer system 300 upon which an embodiment of the invention may be implemented. The preferred embodiment is implemented using one or more computer programs running on a network element such as a router device. Thus, in this embodiment, the computer system 300 is a router.

Computer system 300 includes a bus 302 or other communication mechanism for communicating information, and a processor 304 coupled with bus 302 for processing information. Computer system 300 also includes a main memory 306, such as a random access memory (RAM), flash memory, or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, flash memory or optical disk, is provided and coupled to bus 302 for storing information and instructions.

A communication interface 318 may be coupled to bus 302 for communicating information and command selections to processor 304. Interface 318 is a conventional serial interface such as an RS-232 or RS-322 interface. Display 312, input device 314, and cursor control 316 are also coupled to bus 302. Firmware or software running in the computer system 300 provides a terminal interface or character-based command interface so that external commands can be given to the computer system.

A switching system 316 is coupled to bus 302 and has an input interface 314 and an output interface 319 to one or more external network elements. The external network elements may include a local network 322 coupled to one or more hosts 324, or a global network such as Internet 328 having one or more servers 330. The switching system 316 switches information traffic arriving on input interface 314 to output interface 319 according to pre-determined protocols and conventions that are well known. For example, switching system 316, in cooperation with processor 304, can determine a destination of a packet of data arriving on input interface 314 and send it to the correct destination using output interface 319. The destinations may include host 324, server 330, other end stations, or other routing and switching devices in local network 322 or Internet 328.

The term "machine-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of machine-readable media include, for example, a floppy disk, a flexible disk, hard disk, or any other magnetic medium, a CD-ROM, any other optical medium, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Communication interface 318 also provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for QoS and fault isolation in BGP traffic, address families and routing topologies as described herein.

The received code may be executed by processor 304 as it is received, and/or stored in storage device 310, or other non-volatile storage for later execution. In this manner, computer system 300 may obtain application code in the form of a carrier wave.

4.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of improving latency time of a data transfer between a sender and a receiver comprising the steps of:
   receiving an odd number of data segments from among a plurality of data segments;
   determining whether the receiver is waiting for a further data segment of less than full size based on a total number of full-size data segments received, an amount of information expected in the data transfer, and a maximum segment size;
   sending a message to the sender that triggers the transmission by the sender of said less than full size data segment.

2. The method of claim 1 wherein the amount of information expected in the data transfer is based on a total amount of information expected in the data transfer and an amount of data already received in the data transfer.

3. The method of claim 1 further comprising the step of receiving from the sender a message indicating the total amount of information expected in the data transfer.

4. The method of claim 1 wherein the amount of data already received in the data transfer is a sum of the size of all received data segments.

5. The method of claim 1 wherein the message that triggers the transmission of said less than full size data segment is an acknowledgement message.

6. The method of claim 1 wherein receiving an odd number of data segments is indicated by counting the number of full-size data segments already received.

7. A method of improving latency time of a data transfer between a sender and a receiver comprising the steps of:
   receiving and storing a total amount of information expected in the data transfer;
   receiving an odd number of data segments from among a plurality of data segments;
   determining an amount of data already received in the data transfer based on the size of said odd number of data segments;
   determining whether the receiver is waiting for a further data segment of less than full size based on a number of full-size data segments received, the total amount of data expected in the data transfer as number of bytes required, the number of bytes received, and a maximum segment size;
   sending a message to the sender that triggers the transmission by the sender of said less than full size data segment.

8. A machine-readable tangible volatile or non-volatile medium storing one or more sequences of instructions for improving latency time of a data transfer between a sender and a receiver, wherein execution of the one or more sequences of instructions by one or more processors causes:
   receiving an odd number of data segments from among a plurality of data segments;
   determining whether the receiver is waiting for a further data segment of less than full size based on a total number of full-size data segments received, an amount of information expected in the data transfer, and a maximum segment size;
   sending a message to the sender that triggers the transmission by the sender of said less than full size data segment.

9. A machine-readable tangible volatile or non-volatile medium storing one or more sequences of instructions for improving latency time of a data transfer between a sender and a receiver, wherein execution of the one or more sequences of instructions by one or more processors causes:
   receiving and storing a total amount of information expected in the data transfer;
   receiving an odd number of data segments from among a plurality of data segments;
   determining the amount of data already received in the data transfer based on the size of said odd number of data segments;
   determining whether the receiver is waiting for further data segment of less than full size based on a number of full-size data segments received, the total amount of data expected in the data transfer as number of bytes required, the number of bytes received, and a maximum segment size;
   sending a message to the sender that triggers the transmission by the sender of said less than full size data segment.

10. An apparatus for improving latency time of a data transfer between a sender and a receiver comprising:
   one or more processors;
   one or more stored sequences of instructions which, when executed by the one or more processors, cause the one or more processors to perform the steps of:

receiving an odd number of data segments from among a plurality of data segments;

determining whether the receiver is waiting for a further data segment of less than full size based on a total number of full-size data segments received, an amount of information expected in the data transfer, and a maximum segment size;

sending a message to the sender that triggers the transmission by the sender of said less than full size data segment.

11. The apparatus of claim 10 wherein the amount of information expected in the data transfer is based on a total amount of information expected in the data transfer and an amount of data already received in the data transfer.

12. The apparatus of claim 10 further comprising instructions which, when executed by the one or more processors, cause the one or more processors to perform the step of receiving from the sender a message indicating the total amount of information expected in the data transfer.

13. The apparatus of claim 10 wherein the amount of data already received in the data transfer is a sum of the size of all received data segments.

14. The apparatus of claim 10 wherein the message that triggers the transmission of said less than full size data segments is an acknowledgement message.

15. The apparatus of claim 10 wherein receiving an odd number of data segments is indicated by counting the number of full-size data segments already received.

16. An apparatus for improving latency time of a data transfer between a sender and a receiver comprising:

one or more processors;

one or more stored sequences of instructions which, when executed by the one or more processors, cause the one or more processors to perform the steps of:

receiving and storing a total amount of information expected in the data transfer;

receiving an odd number of data segments from among a plurality of data segments;

determining the amount of data already received in the data transfer based on the size of said odd number of data segments;

determining whether the receiver is waiting for further data segment of less than full size based on a number of full-size data segments received, the total amount of data expected in the data transfer as number of bytes required, the number of bytes received, and a maximum segment size;

sending a message to the sender that triggers the transmission by the sender of said less than full size data segment.

17. An apparatus as in claim 16 wherein the apparatus is any of a network end station and router that is acting as a TCP endpoint.

* * * * *

UNITED STATES PATENT AND TRADEMARK OFFICE
CERTIFICATE OF CORRECTION

PATENT NO. : 7,623,546 B1
APPLICATION NO. : 11/303577
DATED : November 24, 2009
INVENTOR(S) : Bashyam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 853 days.

Signed and Sealed this

Fourteenth Day of December, 2010

David J. Kappos
*Director of the United States Patent and Trademark Office*